United States Patent [19]

Oomen et al.

[11] Patent Number: 5,256,605
[45] Date of Patent: Oct. 26, 1993

[54] METHOD OF MANUFACTURING A HEAVY METAL FLUORIDE GLASS COMPOSITION

[75] Inventors: Emmanuel W. J. L. Oomen; Anne-Marie A. Van Dongen; Hendrik Veenvliet, all of Eindhoven, Netherlands

[73] Assignee: U.S. Philips Corp., New York, N.Y.

[21] Appl. No.: 845,117

[22] Filed: Feb. 28, 1992

[30] Foreign Application Priority Data

Mar. 4, 1991 [NL] Netherlands ............. 9100387

[51] Int. Cl.$^5$ ............................................. C03C 3/112
[52] U.S. Cl. .................................. 501/57; 65/DIG. 16
[58] Field of Search ................... 501/57; 65/DIG. 16

[56] References Cited

U.S. PATENT DOCUMENTS 3,650,779  3/1972  Riebling et al. ................. 501/41

OTHER PUBLICATIONS

"Reaction of NF3 and SF6 with Some Oxides Connected with Heavy-Metal Flouride Glass Processing" M. M. Broer et al, J. Mater. Res. 3(4) pp. 755-760 (1988).
"The Reaction of Fluoroxidizers with Rare Earth Elements, Zirconium and Hafnium Oxides" M. N. Brechovskich et al., Mat. Res. Bull 23 (10) pp. 1417-1421, 1989.
"Preparation of High-Purity Fluorozirconate Glasses" G. G. Devyatykh et al. Z. Anorg. Allg. Chem. 576 pp. 25-32 (1989).
"Chemistry of Fluoride Glasses" M. Poulain et al., Chemtronics 3 (Jun.) pp. 77-85 (1988).

Primary Examiner—Mark L. Bell
Assistant Examiner—A. Wright
Attorney, Agent, or Firm—William L. Botjer

[57] ABSTRACT

Suitable starting materials for the manufacture of a heavy metal fluoride glass composition are mixed with solid xenon fluoride as the fluoridizing reagent, after which the mixture is heated to temperatures between 200° and 400° C. in an inert atmosphere for a time which suffices to bring about fluoridation of the starting materials. The intermediate product thus obtained is melted thereby forming a stable glass composition of a high purity and a high transparency. The method can be carried out in a simple manner in a furnace which need not be gastight.

5 Claims, No Drawings

METHOD OF MANUFACTURING A HEAVY METAL FLUORIDE GLASS COMPOSITION

BACKGROUND OF THE INVENTION

The invention relates to a method of manufacturing a heavy metal fluoride glass composition in which suitable starting materials are mixed in the presence of a fluoridizing reagent and melted together to form the glass composition.

Heavy metal fluoride glass compositions are fluoride glass compositions in which the network former is not beryllium fluoride $BeF_2$ but a heavier metal, often zirconium fluoride $ZrF_4$. Such glass compositions are suitable for the manufacture of infrared transparent components such as windows, glass fibres and lenses, in particular for the wavelength range from 2 to 7 µm. They can also suitably be used as matrix material for lasers and as material in which efficient upconversion processes can be carried out. The glass compositions can be used in the form of both bulk glass and glass fibres. Particular uses lie in the field of optical telecommunications because of the theoretically very small optical losses of the glass compositions.

Heavy metal fluoride glass compositions are generally prepared from anhydrous and oxygen-free components because the presence of oxygen, water, hydroxyl groups and various anionic impurities in the glass composition gives rise to crystallization and the formation of other imperfections. Just like other impurities this causes the light absorption to increase and the stability of the glass composition to decrease. For this reason, such glass compositions are customarily prepared from very pure metal fluorides in an atmosphere containing a fluoridizing reagent. In this manner it is achieved that any impurities present, often oxides and hydroxides, are converted to fluorides and that anionic impurities are replaced by fluorine ions.

In an article by M. M. Broer and R. M. Atkins in J. Mater. Res. 3 (4), pages 755 to 760 (1988), a description is given of a method in which starting materials for the manufacture of heavy metal fluoride glass compositions are pretreated with a fluoridizing reagent such as gaseous $NF_3$ or $SF_6$. Said gases are also used during the melting of the starting materials to produce the glass composition. Said article also describes the use of solid $NH_4F.HF$ as a fluoridizing reagent, which is known per se but which has the drawback of forming water and hydroxyl groups during reaction, which is undesirable.

A disadvantage of the use of very reactive gases such as $NF_3$ and $SF_6$ is that the furnace in which the glass composition is melted may be attacked. Reactions with the wall material of the furnace may take place causing the furnace to be subject to substantial wear. Besides, the products formed in such reactions may contaminate the glass composition. In addition, when very reactive gases are used safety measures must be taken.

SUMMARY OF THE INVENTION

It is an object of the invention to provide, inter alia, a simple method of manufacturing heavy metal fluoride glass compositions of a good optical quality. For this purpose, the invention aims to provide a method which can be performed in a furnace which is not gastight. It is an object of the invention to provide a method in which it is not necessary to use extremely pure and anhydrous starting materials, which method can, in addition, be carried out in an inert atmosphere. When the method is carried out, preferably, no detrimental by-products are formed. The method must provide stable glass compositions of a high purity and a high transparency.

According to the invention, these objects are achieved by a method as described in the opening paragraph, in which method the starting materials are mixed with solid xenon fluoride as the fluoridizing reagent, after which the mixture is heated to temperatures between 200° and 400° C. in an inert atmosphere for a time which is sufficient to bring about fluorination of the starting materials, whereupon the intermediate product thus obtained is melted to form the glass composition. Xenon fluoride having the composition $XeF_4$ can suitably be used in the method according to the invention, but preferably the composition $XeF_2$ is used. A suitable quantity of solid xenon fluoride $XeF_2$ is 1 to 50 mol %, preferably 5 to 25 mol %, smaller quantities hardly having a fluoridizing effect, and larger quantities not being useful because no further improvement of the result is obtained. The quantity which is necessary is also governed by the quality and purity of the starting materials.

In an efficient embodiment of the method according to the invention fluorination of the starting materials is brought about by heating the mixture to a temperature of 200° C. after which the temperature is increased to 400° C. at a rate of less than 50° C./hour.

During heating to temperatures between 200° and 400° C., a gaseous mixture $XeF_n$ is formed, where n has the values 2, 4 and 6. Said gaseous compounds have a strong fluoridizing effect and have the additional advantage that they form a strongly oxidizing atmosphere, thereby precluding the reduction of for example $Zr^{4+}$ to $Zr^{3+}$, and hence blackening of the glass. The by-products formed by fluorination are gaseous (predominantly oxygen, xenon and hydrogen fluoride) and, consequently, they do not have a detrimental effect on the quality of the fluoride glass composition formed.

It is noted that it is known per se to use gaseous $XeF_2$ for the manufacture of pure metal fluorides by a reaction with the corresponding oxides, see M. N. Brechovskich et. al. in Mat. Res. Bull. 23 (10), pages 1417 to 1421 (1988). It is also known to use, inter alia, small quantities of gaseous $XeF_2$ to preclude pyrohydrolysis during the manufacture of fluorozirconate glass compositions, see G. G. Devyatykh and M. F. Churbanov in Z. anorg. allg. Chem. 576, pages 25 to 32 (1989). The use of gaseous xenon fluoride, however, does not provide the advantages according to the invention, such as precluding that the glass furnace is attacked, improved safety and the possibility of using a furnace which is not gastight. Besides, the methods described in the above publications do not make use of the oxidizing effect of xenon fluoride.

The invention will be explained in greater detail by means of an exemplary embodiment in which the glass composition ZBLAN which is known per se is manufactured. Other glass compositions which can be efficiently manufactured by means of the method according to the invention are, for example, described by M. Poulain and G. Maze in Chemtronics 3 (June), pages 77 to 85 (1988). They can be manufactured by the same method as applied in the following exemplary embodiment, the choice of the starting materials and the required quantities of said starting materials having to be adapted in an obvious manner.

DETAILED DESCRIPTION OF THE PREFERRED EMBODIMENTS

Exemplary embodiment

For the preparation of a glass composition on the basis of zirconium fluoride the following constituents were mixed in the indicated quantities: 39.75 mol % $ZrF_4$, 15 mol % $BaF_2$, 3 mol % $LaF_3$, 2.25 mol % $AlF_3$, 15 mol % NaF and 25 mol % $XeF_2$. The mixture was placed in a gastight glassy carbon crucible in an inert atmosphere, according to this example in a nitrogen atmosphere. For this purpose, other inert gases such as argon may alternatively be used. The crucible was placed in a furnace having a temperature of 200° C., which furnace need not be gastight. It is sufficient for the crucible or the reaction vessel in which the mixture of starting materials is placed to be gastight.

The temperature of the furnace was increased from 200° to 400° C. at a rate of 40° C./hour. In this process the xenon fluoride reacted with oxides and hydroxides, which are generally present in the starting materials in small quantities, thereby forming fluorides, oxygen and xenon. Subsequently, the temperature was rapidly raised to above the melting temperature of the mixture, according to the example to 800° C. The molten mixture was kept at said temperature for at least 0.5 hour, after which the glass composition thus obtained was poured into a brass mould having a temperature of 260° C., under a bell-jar which had been filled with nitrogen, whereupon the mixture was cooled at a rate of 40° C./hour. The glass composition thus produced, which is generally termed ZBLAN in literature, had the following composition: 53 mol % $ZrF_4$, 20 mol % $BaF_2$, 4 mol % $LaF_3$, 3 mol % $AlF_3$ and 20 mol % NaF. The glass transition temperature of said material was 265° C. There was no visible blackening of the glass composition thus manufactured. Absorption measurements of said glass composition exhibit no additional absorption bands resulting from the use of xenon fluoride, which indicates that no impurities and/or imperfections have been introduced.

Scattering measurements of the ZBLAN glass composition manufactured according to the invention resulted in values of the scattering factor ranging between 2.0 and 5.0. The scattering factor is the quantity of light which is measured perpendicularly to the direction of the incident light, by way of reference the value 1 being assigned to very pure quartz glass. For comparison: when a fluoridizing gas such as $SF_6$ or $NF_3$ was used, values between 1.5 and 5.0 were attained, which means that the glass obtained by using said fluoridizing gas is of the same quality as the glass obtained by using solid xenon fluoride. For the above-stated reasons, however, the use of such gases is not always desirable. When $NH_4F.HF$ was used as the fluoridizing reagent scattering factors between 20 and 50 were measured.

We claim:

1. A method of manufacturing a fluorozirconate glass composition, in which starting materials including zirconium fluoride are mixed in the presence of a fluoridizing reagent and melted together to form the glass composition, characterized in that the starting materials are mixed with solid xenon fluoride as the fluoridizing reagent, after which the mixture is heated to temperatures between 200° and 400° in an inert atmosphere for a time which is sufficient to bring about fluoridation of the starting materials, whereupon the intermediate product thus obtained is melted to form the fluorozirconate glass composition.

2. A method as claimed in claim 1, characterized in that 1 to 50 mol % of solid xenon fluoride $XeF_2$ is used as the fluoridizing reagent.

3. A method as claimed in claim 2, characterized in that 5 to 25 mol % of solid xenon fluoride $XeF_2$ is used as the fluoridizing reagent.

4. A method as claimed in claim 1, characterized in that fluoridation is brought about by heating the mixture to a temperature of 200° C. after which the temperature is increased to 400° C. at a rate of less than 50° C./hour.

5. A method as claimed in claim 1 wherein the starting materials additionally contain at least one of the fluorides of barium, lanthanum, aluminum and sodium.

* * * * *